Feb. 17, 1959  M. HEBEL  2,873,913
ELECTRICAL MULTIPLIER
Filed Sept. 21, 1955 4 Sheets-Sheet 1

INVENTOR:
Martin Hebel
By:
Michael S. Striker
agt.

Feb. 17, 1959         M. HEBEL         2,873,913
            ELECTRICAL MULTIPLIER
Filed Sept. 21, 1955                 4 Sheets-Sheet 2
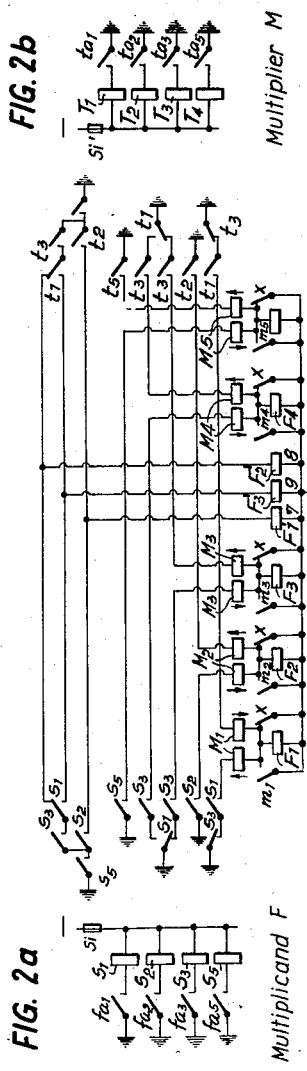
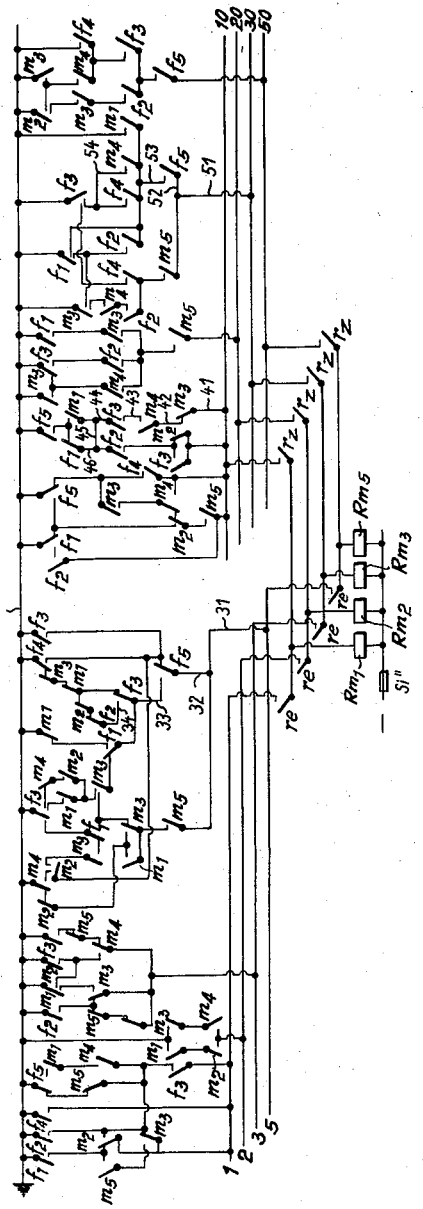
INVENTOR:
Martin Hebel
By:
Michael S. Striker
     agt.

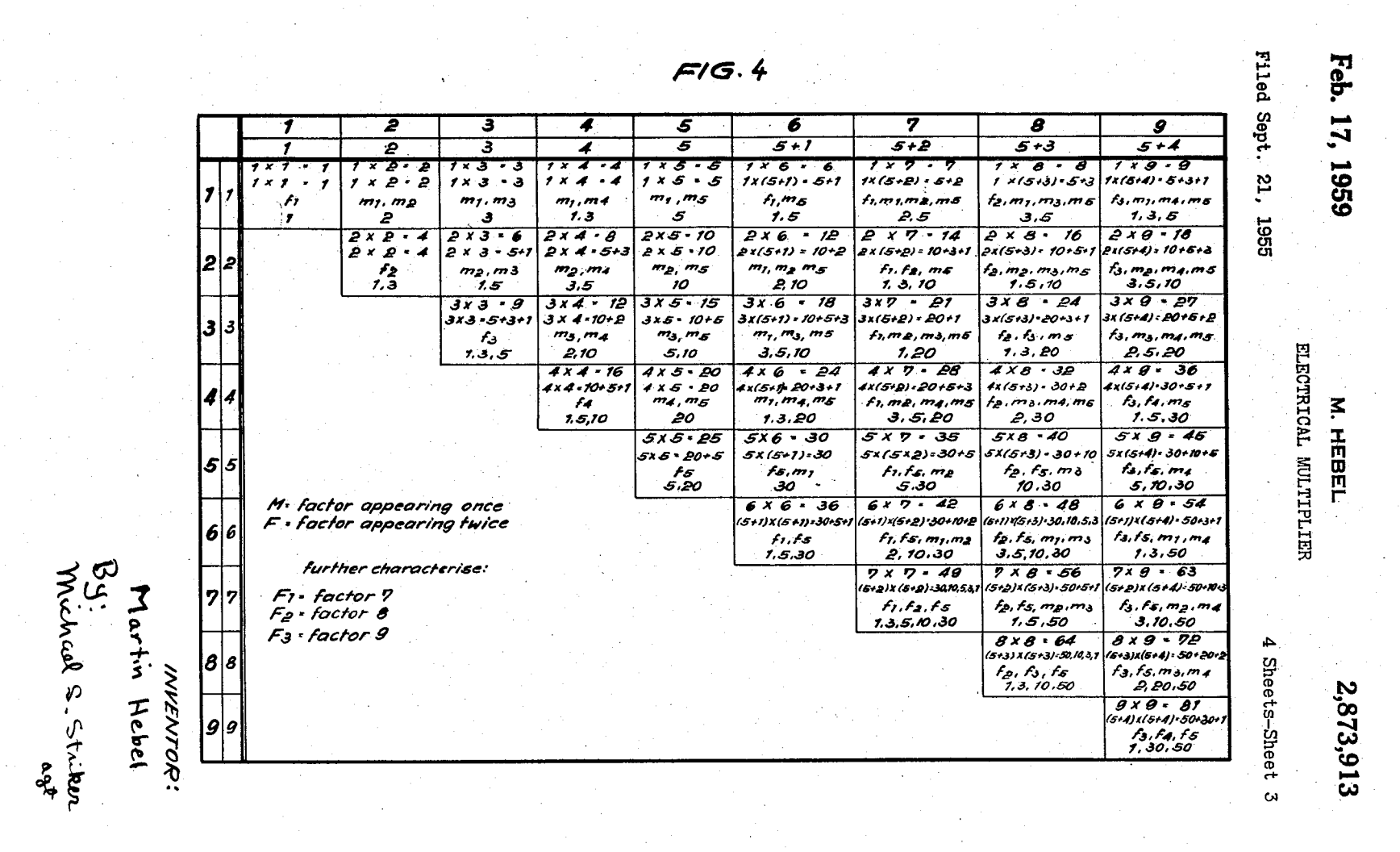

Feb. 17, 1959         M. HEBEL         2,873,913
ELECTRICAL MULTIPLIER
Filed Sept. 21, 1955         4 Sheets-Sheet 3

FIG. 4

INVENTOR:
Martin Hebel
By:
Michael S. Striker
agt

Feb. 17, 1959  M. HEBEL  2,873,913
ELECTRICAL MULTIPLIER
Filed Sept. 21, 1955  4 Sheets-Sheet 4

FIG. 5

Example of a multiplication

| Multiplicand F | Multiplier M | | Result = Product R |
|---|---|---|---|
| 1 2 3 4 5 | 6 7 8 9 | = | 8 3 8 1 0 2 0 5 |
| zt' t' h' z' e' | times t h z e | | ZM M HT ZT T H Z E |

The symbol x denotes a tens transmission to the operation after the next.

| Oper-ation | Storer | Addition Tens | Addition Units | Tens Transmission | ZM | M | HT | ZT | T | H | Z | E | Partial Product times | Dsp F | Dsp M |
|---|---|---|---|---|---|---|---|---|---|---|---|---|---|---|---|
| 1 | | Z | E | | | | | | | | 4 | 5 | 5 9 | e' | e |
| 2 | | H | Z | + | | | | | | 3 | +6 | | 4 9 | z' | e |
| 3 | | H | Z | | | | | | | 4 0 | 0 | 5 | 5 8 | e' | z |
| | | | | | | | | | | 8 | 0 | 5 | | | |
| 4 | | T | H | + | | | | | 2 | +7 | | | 3 9 | h' | e |
| 5 | | T | H | | | | | | 3 | 5 | 0 | 5 | 4 8 | z' | z |
| | | | | | | | | | 3 | 2 | | | | | |
| | | | | | | | | | 6 | 7 | 0 | 5 | | | |
| 6 | | T | H | + x | | | | | x 3 | +5 | | | 5 7 | e' | h' |
| | | | | | | | | | 1 | 0 | 2 | 0 5 | | | |
| 7 | | ZT | T | | | | | | 1 8 | | | | 2 9 | t' | e |
| | | | | | | | | | 2 8 | 2 | 0 | 5 | | | |
| 8 | | ZT | T | + | | | | | 2 +4 | | | | 3 8 | h' | z |
| | | | | | | | | | 5 2 | 2 | 0 | 5 | | | |
| 9 | | ZT | T | + | | | | | 2 +8 | | | | 4 7 | z' | h |
| | | | | | | | | | 8 0 | 2 | 0 | 5 | | | |
| 10 | | ZT | T | x | | | | x 3 | 0 | | | | 5 6 | e' | t |
| | | | | | | | | 1 1 | 0 | 2 | 0 | 5 | | | |
| 11 | | HT | ZT | + | | | | 0 +9 | | | | | 1 9 | zt' | e |
| | | | | | | | | 2 0 | 0 | 2 | 0 | 5 | | | |
| 12 | | HT | ZT | | | | | 1 6 | | | | | 2 8 | t' | z |
| | | | | | | | | 3 6 | 0 | 2 | 0 | 5 | | | |
| 13 | | HT | ZT | | | | | 2 1 | | | | | 3 7 | h' | h |
| | | | | | | | | 5 7 | 0 | 2 | 0 | 5 | | | |
| 14 | | HT | ZT | + | | | | 2 +4 | | | | | 4 6 | z' | t |
| | | | | | | | | 8 1 | 0 | 2 | 0 | 5 | | | |
| 15 | | M | HT | + | | | 0 +8 | | | | | | 1 8 | zt' | z |
| | | | | | | | 1 6 | 1 | 0 | 2 | 0 | 5 | | | |
| 16 | | M | HT | + | | | 1 +4 | | | | | | 2 7 | t' | h |
| | | | | | | | 3 0 | 1 | 0 | 2 | 0 | 5 | | | |
| 17 | | M | HT | | | | 1 8 | | | | | | 3 6 | h' | t |
| | | | | | | | 4 8 | 1 | 0 | 2 | 0 | 5 | | | |
| 18 | | ZM | M | + | | 0 +7 | | | | | | | 1 7 | zt' | h |
| | | | | | | 1 1 | 8 | 1 | 0 | 2 | 0 | 5 | | | |
| 19 | | ZM | M | | | 1 2 | | | | | | | 2 6 | t' | t |
| | | | | | | 2 3 | 8 | 1 | 0 | 2 | 0 | 5 | | | |
| 20 | | HM | ZM | | | 6 | | | | | | | 1 6 | zt' | t |
| | | | | | 8 | 3 | 8 | 1 | 0 | 2 | 0 | 5 | | | |

INVENTOR:
Martin Hebel
By:
Michael S. Striker
agt.

United States Patent Office 2,873,913
Patented Feb. 17, 1959

2,873,913

ELECTRICAL MULTIPLIER

Martin Hebel, Hechendorf am Pilsenee, Upper Bavaria, Germany, assignor to Eldi-Feinmechanik G. m. b. H., Hechendorf am Pilsensee, Germany Application September 21, 1955, Serial No. 535,576

2 Claims. (Cl. 235—161)

The present invention relates to a new and improved electrical multiplier.

More particularly, the present invention relates to a new and improved electrical multiplying apparatus which uses a minimum number of electrical relays having a minimum number of switch contacts.

Electrical multiplying apparatus are known in the art wherein individual switches are used for each of the digits 1 to 9 appearing in the multiplicand factor and the multiplier factor. During the multiplication process, the switches corresponding to the digits 1 to 9 in each of the denominational orders of the multiplicand and multiplier are operated. It is apparent that such an arrangement leads to a large number of switches and switch contacts which must be properly inter-related when each of the digits appearing in the multiplicand and the multiplier are multiplied by each other.

In the present invention a coded system is used for setting up the digits 1 to 9. Several different coding arrangements are possible, such as the use of the digit elements 1, 2, 4, and 8. Also a quinary system can be used. The present invention is described using the coding system employing the digit elements 1, 2, 3, and 5. It is apparent that all the digits 1 to 9 can be obtained by the proper combination of the digit elements 1, 2, 3 and 5.

The use of such a coding system decreases the amount of switches used. In addition, the present invention further decreases the number of switches by operating and completing the same circuit arrangement when multiplying a digit regardless of whether that digit appears in the multiplicand or the multiplier. That is, when carrying out the multiplication (6×3), the same circuit arrangement is completed as when the multiplication (3×6) is being carried out. In this manner, the number of circuit elements may be reduced by as much as one-half. Further advantages of apparatus incorporating the present invention will become apparent from the description thereof.

It is accordingly an object of the present invention to carry out the improvements described hereinabove.

Another object of the present invention is to provide a new and improved electrical multiplier.

A further object of the present invention is to provide an electrical multiplying device using a minimum number of switching elements.

Yet another object of the present invention is to provide an electrical multiplying apparatus wherein the same circuits are completed for multiplying certain digits regardless of whether these digits are part of the multiplier or the multiplicand.

Yet a further object of the present invention is to provide an electrical multiplier device wherein a separate circuit is completed when a digit in the multiplicand is being multiplied by the same digit appearing in the multiplier.

With the above objects in view, the present invention mainly consists of an electrical multiplying device including a set of first electrical input means and a set of second electrical input means for representing, respectively, the multiplicand and the multiplier of a product, the input means of each of the sets of input means being, respectively, associated with the same series of digits or digit elements so that pairs of first and second input means are associated with the same digit elements, each of the input means being operable between an operative condition and an inoperative condition; a source of potential, a set of output terminals respectively associated with the series of digits or digit elements for representing the product of the multiplicand and the multiplier when the source of potential is connected to selected output terminals, a plurality of circuit means, each of the circuit means including circuit completing means, at least one of the circuit means connecting each of the output terminals to the source of potential when the respective circuit completing means are actuated, and a set of electrical actuating means, each of the actuating means being respectively associated with predetermined circuit completing means for connecting the source of potential to at least one selected output terminal, each of the actuating means being connected to one pair of the pairs of first and second input means and controlled by the first and second input means of the respective pair in such manner that the circuit completing means, associated with the respective actuating means, complete circuit means associated therewith when either input means of the respective pair of first and second input means is in the operative condition.

In another embodiment, the present invention consists of an electrical multiplying device including a set of first electrical input means and a set of second electrical input means for representing, respectively, the multiplicand and the multiplier of a product, the input means of each of the sets of input means being, respectively, associated with the same series of digits or digit elements so that pairs of first and second input means are associated with the same digit elements, each of the input means being operable between an operative condition and an inoperative condition, a source of potential, a first set of output terminals respectively associated with the series of digits or digit elements for representing a first denominational order of the product of the multiplicand and the multiplier when the source of potential is connected to selected output terminals, a second set of output terminals respectively associated with the series of digits or digit elements for representing a second denominational order of the product of the multiplicand and the multiplier when the source of potential is connected to the second set of output terminals, a plurality of circuit means, each of the circuit means including circuit completing means, at least one of the circuit means connecting each of the output terminals to the source of potential when the respective circuit completing means are actuated, and a set of electrical actuating means, each of the actuating means being respectively associated with predetermined circuit completing means for connecting the source of potential to at least one selected output terminal, each of the actuating means being connected to one pair of first and second input means and controlled by the first and second input means of the respective pair in such manner that the circuit completing means, associated with the respective actuating means, complete circuit means associated therewith when either input means of the respective pair of first and second input means is in the operative condition.

In still another embodiment, the present invention includes an electrical multiplying device having a first set of electrical input switch means and a set of second electrical input switch means for representing, respectively, the multiplicand and the multiplier of a product, the input switch means of each of the sets of input means being, respectively, associated with the same series of digits or digit elements so that pair of first and second input switch means are associated with the same digit elements, each of the input switch means being operable between an operative closed condition and an inoperative open condition, a source of potential, a set of output terminals respectively associated with the series of digits or digit elements for representing the product of the multiplicand and the multiplier when the source of potential is connected to selected output terminals, a plurality of circuit means, each of the circuit means including circuit completing switch means, at least one of the circuit means connecting each of the output terminals to the source of potential when the respective circuit completing switch means are actuated, a set of actuating relay means, each of the actuating relay means being respectively associated with predetermined circuit completing switch means for connecting the source of potential to at least one selected output terminal, at least some of the actuating relay means including a pair of oppositely wound coils respectively connected in series with the input switch means of one pair of the pairs of first and second input switch means, a relay having a first relay coil connected in series with the oppositely wound coils, a first bridging switch connected in parallel with the first relay coil and being normally in open position and being closed when only one of the oppositely wound coils is energized, and a second bridging switch connecting in parallel with the first relay coil, and being normally in closed position, and a relay winding connected at one end thereof through all the actuating relay means and the first and second input switch means to one terminal of the source of potential and being connected at the other end thereof to the other terminal of the source of potential, the relay means operating the bridging switches so that the circuit completing switch means associated with the respective actuating relay means complete the circuit means associated therewith when either input switch means is in the operative closed condition, and complete other circuit means of the circuit means associated therewith when both first and second input switch means of the respective pair of first and second input switch means are in the operative closed condition and both the oppositely wound coils are energized, the first bridging switch remaining open, the other circuit means connecting the source of potential to selected output terminals representing the product of the digit elements represented by the first input switch means of the respective pair of the first and second input switch means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is an electrical schematic diagram of the signal combining apparatus forming a part of the present invention;

Fig. 2a is an electrical schematic diagram of the digit element switches and relays used to set up the multiplicand;

Fig. 2b is an electrical schematic diagram of the digit element switches and relays used to set up the multiplier;

Fig. 3 is an electrical schematic diagram of the multiplying apparatus used in the present invention;

Fig. 4 is a chart listing the relays of Figs. 2 and 3 which are actuated during the multiplication process for any digits appearing in the multiplicand and the multiplier; and Fig. 5 is a chart explaining the step by step operation of the present invention as described for an illustrative example.

Figure 1:
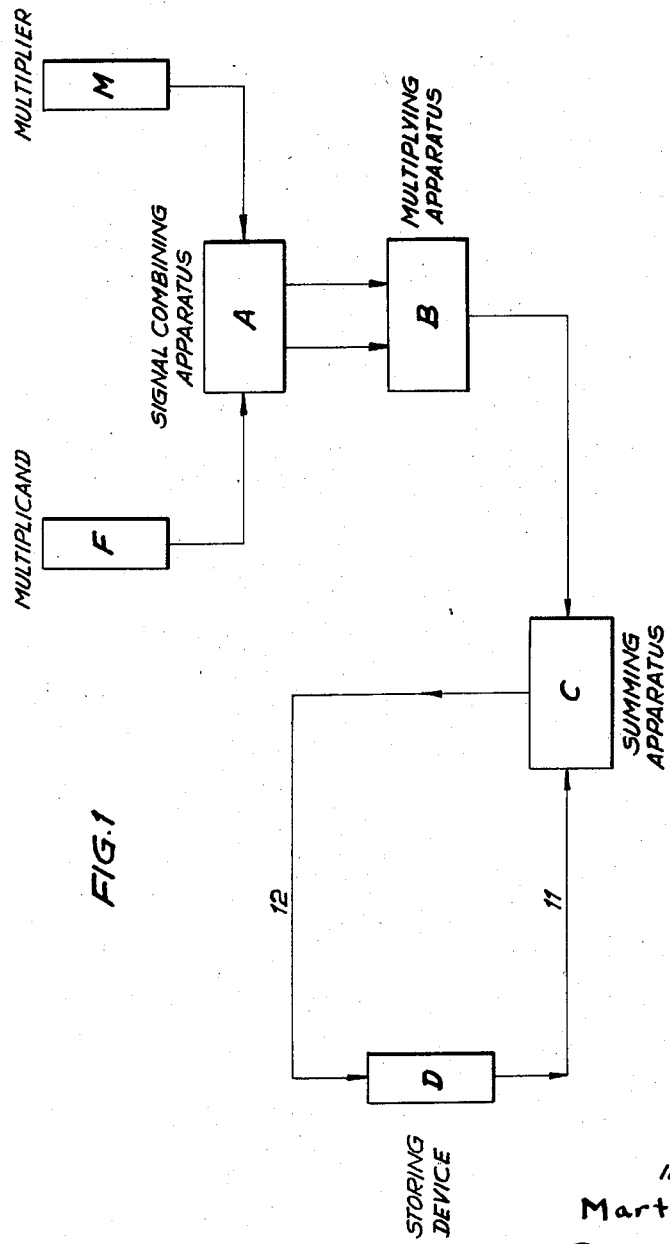
Fig. 1 is a block diagram showing the relationship between the various elements of the present invention.

Referring to the drawings and more particularly to Fig. 1, the overall operation of the present invention will be explained. The numbers appearing in the multiplicand are set up digit by digit by the relays and switches in the block F. The numbers appearing in the multiplier are set up digit by digit by the relays and switches appearing in the block M. Each multiplicand of the multiplicand factor F operates preselected relays in the signal combining apparatus A. Each multiplier of the multiplier factor M operates preselected relays in the signal combining apparatus A.

A computing and timing device, not illustrated, and which forms no part of the present invention, applies the digits of each multiplicand of the multiplicand factor F and of each multiplier of the multiplier factor M to the signal combining apparatus A in accordance with a predetermined relationship which will be described more fully with reference to Fig. 5. Such a computing and timing device is disclosed, for example, in my co-pending U. S. application Serial No. 385,853.

The relays operated in the signal combining apparatus A by the simultaneously applied digits of the multiplicand and the multiplier complete preselected circuits in the multiplying apparatus B which, in turn, apply a source of potential to selected output terminals thereof corresponding to the product of the digits applied to the signal combining apparatus A.

The computing and timing device then applies the potential appearing on the selected output terminals of the summing apparatus C. In the summing apparatus, the product of the two digits is added in its proper denominational order to any previous product previously transmitted thereto and the new sum is applied on the conductor 12 to the storing device D. The storing device D reapplies this new sum on conductor 11 to the summing apparatus C where this new sum is added to the next product of the next two digits combined in the appartus A. This next sum is transmitted back to the storing device D on conductor 12 and from there back to the summing apparatus C where the process is continued until each of the digits of the multiplicand factor F has been multiplied by each of the digits of the multiplier factor M. The summing apparatus then exhibits a sum which is equal to the summation in their proper denominational order, of all of the products between each of the digits in the multiplicand factor F and each of the digits in the multiplier factor M.

The summing apparatus C forms no part of the present invention and an apparatus such as the type disclosed in my co-pending U. S. application Serial No. 525,957 may be used. Similarly, a storing device such as disclosed in my co-pending U. S. application Serial No 385,853 and Serial No. 525,958 may be used.

Referring now to Figs. 2, 2a and 2b, the switches and relays corresponding to the digit elements of one denominational or decimal order of the multiplicand factor F and the multiplier factor M are shown on opposite sides of the signal combining apparatus. The switches $fa_1$, $fa_2$, $fa_3$ and $fa_5$ correspond respectively to the digit elements 1, 2, 3 and 5 of one denominational order of the multiplicand factor F. Each of these switches has one terminal connected to ground potential and the other, normally open, terminal connected respectively to one side of its corresponding relay of the group of relays $S_1$, $S_2$, $S_3$ and $S_5$. The S relays have their other terminals connected together and to the negative terminal of a source of potential (not shown) through a fuse $Si$. The other terminal of the potential source is connected to ground.

It is apparent that when any of the switches $fa_1$, $fa_2$, $fa_3$ and $fa_5$ is closed it will energize its corresponding S relay.

Similarly, in Fig. 2b, the switches $ta_1$, $ta_2$, $ta_3$ and $ta_5$ correspond to the digit elements 1, 2, 3 and 5 of one denominational order of the multiplier factor M. These switches cooperate respectively with relays $T_1$–$T_5$ so that the corresponding T relay is energized whenever one of the switches $ta_1$–$ta_5$ is closed.

To operate the multiplicand and the multiplier switches $fa$ and $ta$, respectively, several different systems may be used. A punched card system can be used wherein the analyzer means, which senses the punched card, column by column and denominational order by denominational order, can correspond to the switches $fa_1$–$fa_5$ and $ta_1$–$ta_5$. Also, the switches $fa$ and $ta$ can be operated by the storing device or the computer and timing device. They also may be operated from a keyboard or from analyzer means sensing punch cards.

Refer now to Fig. 2, a set of first electrical input means is shown at the left hand portion of the figure and a set of second electrical input means is shown at the right hand portion of the figure. The set of first electrical input means includes switches $s_1$, $s_2$, $s_3$ and $s_5$. These switches are operated respectively by the relays $S_1$, $S_2$, $S_3$ and $S_5$. It can be seen for example that if the digit 8 appears as the multiplicand the switches $fa_3$ and $fa_5$ are closed to operate, respectively, the relays $S_3$ and $S_5$. These relays operate respectively the switches $s_3$ and $s_5$. It should be noted that some of the $s$ switches are normally open and others are normally closed. When a relay is energized, its corresponding normally open switches are closed and its corresponding normally closed switches are opened. Similarly, the multiplier digit appearing in the multiplier factor M causes corresponding $t$ switches to be operated.

The input switches means $s_1$–$s_5$ are connected respectively to one side of left relay coils $M_1$–$M_5$. In addition, normally open switches $s_1$ and $s_3$ are connected between ground potential and one side of the left relay coil $M_4$. The other sides of the relays $M_1$, $M_2$, $M_3$, $M_4$ and $M_5$ are connected to one side respectively of relay coils $F_1$, $F_2$, $F_3$, $F_4$ and $F_5$. The other sides of the F relays are all connected together and are connected to one terminal of relay X, the other terminal of which is directly connected to the negative terminal of the potential source.

The other sides of the relays $M_1$–$M_5$ are also connected respectively to the input switch means $t_1$–$t_5$ through right relay coils $M_1$, $M_2$, $M_3$, $M_4$ and $M_5$. The right relay coils $M_1$–$M_5$ are wound about the same relay core as the left respective relay coils $M_1$–$M_5$, but they are wound in the opposite direction therefrom. Therefore, for example, if either the left or the right relay coil $M_1$ is energized it will operate all the switches labeled $m_1$. However, since the left and the right relay coils $M_1$ are oppositely wound on the same relay core, if both of these relay coils are energized at the same time, the switches $m_1$ will not be operated.

From Fig. 2 it can be seen that each of the M relay coils are connected to the same digit elements in the multiplicand and the multiplier. That is, left relay coil $M_1$ is connected to input switch means $s_1$ while right relay coil $M_1$, wound in the opposite direction, is connected to the input switch means $t_1$.

In addition to the above, additional relay coil windings are provided for the digits 7, 8 and 9. For the digit 7, a relay winding $F_1'$ is provided which is wound upon the same core as the relay winding $F_1$ and in the same direction so that the relay switches $f_1$ are operated whether the relay windings $F_1$, $F_1'$, or both are energized. Similarly, the digits 8 and 9 also operate additional windings $F_2'$ and $F_3'$, thereby operating respectively the switches $f_2$ and $f_3$.

As an illustrative example of the operation of the present invention, assume that the digit 5 appears as the multiplicand and the digit 9 appears as the multiplier. Accordingly, the switches $fa_5$ and $ta_1$, $ta_3$, $ta_5$ will be closed. The closing of the switch $fa_1$ will energize the relay $S_5$, thereby operating the switches $s_5$ and applying ground potential to the left relay coil $M_5$. Similarly, the closing of the switches $ta_1$ and $ta_3$ will energize the relays $T_1$ and $T_3$ to operate the switches $t_1$ and $t_3$. This will apply ground potential to the right relay coil $M_4$.

It should be noted from the diagram that when both switches $t_1$ and $t_3$ are operated, the resultant arrangement applies ground potential to the right relay coil $M_4$ without applying ground potential to any of the relay coils $M_1$ or $M_3$. However, if only one of these switches $t_1$ or $t_3$ is operated, ground potential will be applied to the corresponding right relay coil $M_1$ or $M_3$.

The operation of the switch $ta_5$ energizes the relay $T_5$ and operates the switches $t_5$. This applies ground potential to the right relay coils $M_5$. Also, the operation of the switches $t_1$, $t_3$ and $t_5$ applies ground potential to the relay coil $F_3'$.

Therefore the operation of the above switches has the following results: (1) Both the left and right coils $M_5$ are energized in series with the relay X which is also energized. Since both coils $M_5$ are energized and oppositely wound, their net resultant flux is zero and the switches $m_5$ are not operated. However, when the switch $x$ is opened by the energization of the relay X, the relay coil $F_5$ is energized to operate all the switches $f_5$.

(2) That right coil $M_4$ is energized in series with the relay X so that the switches $m_4$ and $x$ are operated. The relay X has a slight time delay so that the switches $m_4$ operate before the switch $x$. Accordingly, it can be seen that the switch $m_4$ appearing in Fig. 2 acts as a bridging contact across the relay coil $F_4$ and thereby prevents this coil from being energized.

The relay winding $F_3'$ is energized in series with relay X to operate the switches $f_3$.

Referring now to Fig. 3 the results of the energization of the relays in the signal combining apparatus of Fig. 2 will be described with respect to the multiplying apparatus of Fig. 3. From the above described operation relays $M_4$, $F_3'$ and $F_5$ are energized to operate, respectively, switches $m_4$, $f_3$ and $f_5$. In Fig. 3 two sets of output terminals are illustrated. One set corresponds to a first denominational order 1, 2, 3 and 5. The second set corresponds to the next succeeding denominational order 10, 20, 30 and 50. The operations of the various switches $m_1$–$m_5$ and $f_1$–$f_5$ in preselected patterns apply ground potential from conductor 61 to preselected output terminals.

With the operation of switches $m_4$, $f_3$ and $f_5$, as described hereinabove, ground potential is applied to the output terminal 5 of the first denominational order and the output terminals 10 and 30 of the second denominational order. This can be traced as follows: (1) From the output terminal 5 on conductor 31 to conductor 32, through operated switch $f_5$ to conductor 33, through operated switch $f_3$ to conductor 34 and from there through normally closed switches $f_2$, $m_2$, $m_1$, $m_3$ and $f_4$ to conductor 61.

(2) From the output terminal 10 on conductor 41, through normally closed switch $m_3$ to conductor 42, through operated switch $m_4$ to conductor 43, through operated switch $f_3$ to conductor 44, through conductors 45 and 46, through normally closed switch $f_1$ and through operated switch $f_5$ to conductor 61.

(3) From output terminal 30 through conductors 51 and 52, through operated switch $f_5$ to conductor 53, through operated switch $m_4$ to conductor 54 and through operated switch $f_3$ to conductor 61.

Thus, from the above-described operation, by multiplying 5 as the multiplicand, by 9 as the multiplier, ground potential has been applied to the output terminals 5, 10, and 30. It is apparent that the output terminal 5 corresponds to the units denominational order and the output terminals 10 and 30 correspond to the tens denominational order. The sum of 10, 30 and 5 is 45 which is the product of 5 and 9.

In order to transmit the ground potentials applied to the preselected output terminals 5, 10 and 30, the four relays $Rm_1$, $Rm_2$, $Rm_3$ and $Rm_5$ are provided. The relay $Rm_1$ may be connected to the output terminal 1 by a switch $re$ and to the output terminal 10 by a switch $rz$. Similarly, relay $Rm_2$ may be connected to the output terminals 2 or 20; relay $Rm_3$ to terminals 3 or 30; and relay $Rm_5$ to terminals 5 and 50.

The $Rm$ relays all have one of their terminals connected to the negative terminal of a source of potential through a fuse $Si''$. The switches $re$ are all simultaneously closed by cam means, not shown, operated by the computing and timing device which may in turn be connected to the storing device D in Fig. 1. When the switches $re$ are closed, all of the $Rm$ relays are connected to their respective output terminals in the units denominational order. Those output terminals which have ground potential applied thereto will energize the respective $Rm$ relay connected thereto. In the illustrative example, only the $Rm_5$ relay will be energized since only output terminal 5 is connected to ground potential. Accordingly, the $Rm_5$ relay will operate its respective switch in the summing apparatus C shown in Fig. 1 and the digit 5 will be positioned in its proper denominational order in the summing apparatus C.

After the $re$ switches have been opened, all of the $rz$ switches are closed by the timing device and the $Rm$ relays are connected to the second set of output terminals 10—50. In the illustrative example, only the terminals 10 and 30 have ground potential applied thereto and accordingly only the relays $Rm_1$ and $Rm_3$ will be energized. These relays operate their respective switches in the summing apparatus C so that the number 40 is placed in its proper denominational order.

After the respective closing and opening of the $re$ and $rz$ switches, the product 45 has been transmitted to the summing apparatus and registered therein. Accordingly, the summing apparatus can add the product 45 to any previous sum registered therein, with the resulting new sum being transmitted to the storing device D. When the new sum reaches the storing device, the computing and timing apparatus connected thereto moves to the next digit in either the multiplier factor or the multiplicand factor and the next multiplication of two digits is carried out.

It is clear that before the new digits are set up in the multiplicand and multiplier apparatus F and M respectively, the previous digits are cleared so that all the switches return to their normal open or closed positions.

It is a feature of the present invention that the same circuits will be completed whether the digit 5 appears as the multiplier or the multiplicand and whether the digit 9 appears respectively as the multiplier or the multiplicand. That is, if the digit 9 appears as the multiplicand, the switches $fa_1$, $fa_3$ and $fa_5$ are operated to energize, respectively, relays $S_1$, $S_3$ and $S_5$. These, in turn, operate switches $s_1$, $s_3$ and $s_5$. This energizes the left relay $M_4$, left relay $M_5$ and relay $F_3'$.

Similarly, if the digit 5 appears as the multiplier the relay $T_5$ is energized to operate switches $t_5$. This energizes right relay coil $M_5$. The result of this operation would be the energization of left relay coil $M_4$, relay coil $F_3'$ and relay coil $F_5$. This would operate switches $m_4$, $f_3$ and $f_5$. Note that these are the same switches that are operated when the digit 9 appeared as the multiplier and the digit 5 appeared as the multiplicand.

Therefore, it can be seen that apparatus incorporating the principles of the present invention substantially reduces the number of relays and switches required for a multiplying apparatus. That is, whether a digit element appears in the multiplier or in the multiplicand, the same switch means will be actuated. If the same digit element appears in both the multiplier and the multiplicand, the corresponding F relay is energized as explained hereinabove with respect to the digit elements 5.

It can be seen, therefore, that the signal combining apparatus according to this invention yields the advantage that no matter whether of two factors one appears as multiplicand and the other as multiplier, or vice versa, only one circuit through the multiplying apparatus has to be established once for each digit involved.

Referring now to Fig. 4, a chart is provided indicating the various switches which are closed during the multiplication of any two digits between 1 and 9. This chart also shows how each of the digits are made up of the various digit elements. From this chart it can be seen that the multiplication 5×9 is carried out by changing the digit 9 into its digit elements 5+4 or 5+3+1. The switches $f_3$, $f_5$ and $m_4$ are actuated and the output terminals 5, 10 and 30 have ground potential applied thereto. As indicated hereinabove, it is immaterial whether 5 or 9 is the multiplier or multiplicand.

The digit 0 is automatically taken care of when the relays $re$ or $rz$ are closed and no ground potential is applied to any of the $Rm$ relays of Fig. 3. The summing apparatus accordingly will register a 0 in the corresponding denominational order.

It can be appreciated that there is no theoretical limit to the number of digits that may be included in the multiplier and multiplicand factors. The multiplying apparatus constructed in accordance with the present invention multiplies one digit in the multiplicand factor by one digit in the multiplier factor. The resulting product is then added to the previous products until all of the products have been added to obtain the desired result corresponding to the multiplication of all the digits in the multiplicand factor by all of the digits in the multiplying factor.

That is, the multiplication is carried out by a series of additions wherein each sum of each addition represents a product of two digits, one being in the multiplicand, and the other being in the multiplier.

Referring now to Fig. 5, an illustrative example is given wherein the multiplicand factor is 12,345 and the multiplier factor is 6,789. The first column of Fig. 5 represents the number of multiplications between various digits of the multiplicand factor F and the multiplier factor M. Column (2) indicates the denominational order in which the result obtained by the closing of the $rz$ switch in Fig. 3 is registered. Column (3) indicates the denominational order in which the result obtained by the closing of the $re$ switch is registered in the summing apparatus. Column (4) indicates when the tens transport device in the summing apparatus must be operated. Columns (5)–(12) indicate the various denominational orders required for the registering of the partial products and sums in the summing apparatus and the storing device. Columns (5)–(12) proceed from the ten-million denominational order to the units denominational order.

Column 13 indicates which of the digits of the multiplicand factor F is operating as the multiplicand for the corresponding step. Similarly, column 14 indicates which of the digits of multiplier factor M is operating as the multiplier for the corresponding step.

Column 15 indicates the denominational order in the multiplicand factor of the particular digit operating as the multiplicand for the particular step. Similarly, column 16 indicates the denominational order in the multiplier factor of the particular digit operating as the multiplier for the particular step.

From this chart it can be seen that in the first step, the digit 5 which corresponds to the units denominational order of the multiplicand factor is multiplied by the digit 9 which corresponds to the units denominational order of the multiplier factor. The switches $re$ operate in the units denominational order and the switches $rz$ operate in the tens denominational order. The resulting product 45 is obtained as indicated hereinabove by the illustrative example and this product is stored in the storing device until the carrying out of the next step.

In the next step the digit 4, corresponding to the tens denominational order of the multiplicand factor operates as the multiplicand and the digit 9 corresponding to the units denominational order of the multiplying factor operates as the multiplier as before. In this operation the $re$ switches operate in the tens denominational order and the $rz$ switches operate in the hundreds denominational order. The tens transport device of the summing apparatus C is operated so that the digit 6 appearing in the product 36 is registered in the tens denominational order. The $rz$ switches always operate in the next highest denominational order from the $re$ switches.

From Fig. 4 it can be seen that in the second step wherein 4 is multiplied by 9, the switches $f_3$, $f_4$ and $m_5$ in the multiplying apparatus of Fig. 3 are operated by the corresponding relays of Fig. 2 to apply ground potential to the output terminals 1, 5 and 30.

In the summing apparatus the previous product 45 is added to the next product 36 placed in the proper denominational order to provide the sum 405 which is stored in the storing device until it is to be added to the product of the next operational step. This next operational step is the multiplication of $5 \times 8$ as indicated in Fig. 5.

Therefore the rest of the multiplication is carried out as indicated in Fig. 5 and for each multiplication of two digits the switches and relays that are operated are indicated in Fig. 4. Fig. 4 also indicates which output terminals have ground potential connected thereto to provide the proper product.

Each of the products, as they are obtained, is added to the sum of the previous product which has been stored in the storing device. This continues until the final result of 83,810,205 is obtained.

In the present invention, each of the relays are chosen to have a relatively low operating voltage so that sufficient voltage is obtained to energize all of the relays even if three of them are connected in series.

It will be understood that each of the elements described above, or two or more together, may also find a useful application in other types of computing apparatus differing from the types described above.

While the invention has been illustrated and described as embodied in an electrical multiplying device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrical multiplying device, in combination, a set of first electrical input switch means and a set of second electrical input switch means for representing, respectively, the multiplicand and the multiplier of a product, the input switch means of each of said sets of input means being, respectively, associated with the same series of digits or digit elements so that pairs of first and second input switch means are associated with the same digit elements, each of said input switch means being operable between an operative closed condition and an inoperative open condition; a source of potential; a set of output terminals respectively associated with said series of digits or digit elements for representing the product of said multiplicand and said multiplier when said source of potential is connected to selected output terminals; a plurality of circuit means, each of said circuit means including circuit completing switch means, at least one of said circuit means connecting each of said output terminals to said source of potential when the respective circuit completing switch means are actuated; a set of actuating relay means, each of said actuating relay means being respectively associated with predetermined circuit completing switch means for connecting said source of potential to at least one selected output terminal, at least some of said actuating relay means including a pair of oppositely wound coils respectively connected in series with the input switch means of one pair of said pairs of first and second input switch means, a relay having a first relay coil connected in series with said oppositely wound coils, a first bridging switch connected in parallel with said first relay coil and being normally in open position and being closed when only one of said oppositely wound coils is energized, and a second bridging switch connecting in parallel with said first relay coil, and normally being in closed position; and a relay winding connected at one end thereof through all said actuating relay means and said first and second input switch means to one terminal of said source of potential and being connected at the other end thereof to the other terminal of said source of potential, said relay means operating said bridging switches so that the circuit completing switch means associated with the respective actuating relay means complete the circuit means associated therewith when either input switch means is in said operative closed condition, and complete other circuit means of said circuit means associated therewith when both first and second input switch means of the respective pair of first and second input switch means are in said operative closed condition and both said oppositely wound coils are energized, said first bridging switch remaining open, said other circuit means connecting said source of potential to selected output terminals representing the product of the digit elements represented by said first input switch means of the respective pair of the first and second input switch means.

2. Apparatus as claimed in claim 1, wherein the actuating relay means connected in series with the input switch means, corresponding to the digits 7, 8 and 9, comprise second coils respectively wound on said respective relays to operate said other circuit means whenever input switch means corresponding to the digits 7, 8 or 9 is in said operative condition.

References Cited in the file of this patent

UNITED STATES PATENTS 2,394,924    Luhn ------------------ Feb. 12, 1946